United States Patent
Shirakawa et al.

(10) Patent No.: US 7,734,447 B2
(45) Date of Patent: Jun. 8, 2010

(54) RADIATION MEASURING DEVICE AND DATA PROCESSING METHOD

(75) Inventors: Yoshiyuki Shirakawa, Chiba (JP); Yusuke Kobayashi, Mitaka (JP); Toshiya Yamano, Mitaka (JP)

(73) Assignees: National Institute of Radiological Science, Chiba (JP); Aloka Co., Ltd., Tokyo (JP)

( * ) Notice: Subject to any disclaimer, the term of this patent is extended or adjusted under 35 U.S.C. 154(b) by 406 days.

(21) Appl. No.: 11/917,459

(22) PCT Filed: Nov. 27, 2006

(86) PCT No.: PCT/JP2006/323544
§ 371 (c)(1),
(2), (4) Date: Dec. 13, 2007

(87) PCT Pub. No.: WO2007/063790
PCT Pub. Date: Jun. 7, 2007

(65) Prior Publication Data
US 2009/0271143 A1 Oct. 29, 2009

(30) Foreign Application Priority Data
Nov. 30, 2005 (JP) .............................. 2005-346308

(51) Int. Cl.
*G01T 1/29* (2006.01)
(52) U.S. Cl. ..................................................... 702/189
(58) Field of Classification Search .................. 702/189
See application file for complete search history.

(56) References Cited
FOREIGN PATENT DOCUMENTS

| | | | |
|---|---|---|---|
| JP | 4-132987 A | 5/1992 | |
| JP | 2004-191327 A | 7/2004 | |
| JP | 2004-301798 A | 10/2004 | |
| JP | 2004-361290 A | 12/2004 | |
| JP | 2006-201086 A | 8/2006 | |
| WO | 2006-077752 A1 | 12/2007 | |

OTHER PUBLICATIONS

Notification of Transmittal of Copies of Translation of the International Preliminary Report on Patentability (Form PCT/IB/338) of International Application No. PCT/JP2006/323544 mailed Jun. 12, 2008 with Forms PCT/IB/373, PCT/IB/326, PCT/ISA/237 and English translation form PCT/ISA/237.

(Continued)

*Primary Examiner*—Tung S Lau
(74) *Attorney, Agent, or Firm*—Westerman, Hattori, Daniels & Adrian, LLP

(57) ABSTRACT

A radiation measuring device capable of identifying the incident direction of a radiation ray and energy (segmentation). The directivity characteristics of a plurality of detectors are different from each other. A plurality of energy segmentations are set respectively for a plurality of spectra corresponding to a plurality of detectors, and actual measurement ratio information (a plurality of actual measurement counting ratios) expressing the mutual ratio between integrated counting values for each energy segmentation is computed. The actual measurement ratio information is checked against a plurality of response functions, and, when the compatibility relation between specific actual measurement ratio information and specific theoretical ratio information is found, the incident direction of a radiation ray and an energy segmentation are identified based on that relation.

15 Claims, 15 Drawing Sheets

OTHER PUBLICATIONS

Y. Shirakawa, "Nondirectional Detectors", ISOTOPE NWES, pp. 13-15, Aug. 1, 2005. Cited in the ISR.

Y. Shirakawa, "Development of nondirectional detectors with NaI (TI)", Radioisotopes, vol. 53, No. 8, pp. 445-450, Aug. 2004.

International Search Report of PCT/JP2006/323544, date of mailing Feb. 27, 2007.

RADIATION MEASURING DEVICE AND DATA PROCESSING METHOD

TECHNICAL FIELD

The present invention relates to a radiation measurement apparatus and a data processing method, and in particular to a technique for identifying an incident direction or the like of radiation.

BACKGROUND ART (1) Background of Invention

The present invention was made as a product of research and development efforts conducted by ALOKA CO., LTD., a Japanese corporation, related to the "direction finding gamma ray detector" project commissioned under the auspices of the Japan Science and Technology Agency, an agency of the Government of Japan.

(2) Related Art

Monitoring posts are commonly provided as radiation measurement apparatuses, for example, along the periphery of facilities such as nuclear power plants, a nuclear fuel processing facilities, etc., or at measurement points determined by local governments, and continuously execute radiation measurement at the location at which they are installed. With this system, the presence or absence of abnormalities is monitored at all times. At such a monitoring post, it is usually desirable that the direction of emission of any detected radiation be automatically identified. As a method for identifying the incident direction of radiation, a method is known in which a directional detector is rotated. In a typical directional detector, because a collimator and a shielding member comprising lead or the like are provided, a large and relatively complicated mechanism is required for rotating the detector. It is also desirable to identify the incident direction of radiation measurement apparatuses other than monitoring posts (such as, for example, a floor-mounted survey monitor). Reference 1 (JP 2004-191327 A), Reference 2 (JP 2004-361290 A), and Reference 3 (Yoshiyuki SHIRAKAWA, "Development of nondirectional detectors with NaI(Tl)", RADIOISOTOPES, Vol. 53, No. 8, pp. 445-450, August 2004) all disclose that a peak is identified in each of a plurality of spectra obtained using a plurality of types of scintillators, a ratio of counts for the plurality of peaks is determined, and the incident direction (incoming direction) of the radiation is identified based on the ratio. Japanese Patent Application No. 2005-014578 is related to the present application.

However, when the method of identifying a peak in a spectrum as noted above is used, there is a problem that the reliability of the calculation is reduced if the peak is unclear or there is a problem with the precision of the peak identification. Although it is possible to wait and not execute the calculation until after a peak has clearly appeared, such a configuration prevents quick processing. It is desired that it be possible to discriminate among radiation from a plurality of sources simultaneously incident upon the detector. Moreover, it is desired that it be possible to identify the energy, level, and/or energy interval of radiation in addition to identifying its incident direction.

DISCLOSURE OF INVENTION

An object of the present invention is to enable analysis of an incident direction and/or energy of radiation without identifying a spectral peak.

Another object of the present invention is to enable identification of radiation from a plurality of sources even when the radiations are simultaneously incident.

A further object of the present invention is to realize a display method which allows intuitive recognition of the incident direction and energy of radiation.

According to one aspect of the present invention, there is provided a radiation measurement apparatus comprising a detecting section which comprises a plurality of detectors provided to have directivity characteristics that differ from each other and which detects radiation with the detectors, a calculating section which calculates, based on a plurality of detection data obtained by the plurality of detectors and for each energy interval among a plurality of energy intervals, actual ratio information representing mutual ratios for a plurality of individual counts corresponding to the plurality of detectors, a generating section which generates, for each energy interval, a response function which provides theoretical ratio information which changes according to an incident direction, and a comparing section which compares a plurality of actual ratio information corresponding to the plurality of energy intervals with a plurality of response functions corresponding to the plurality of energy intervals, and identifies, when a matching relationship is determined between particular actual ratio information and particular theoretical ratio information, at least one of an incident direction and an energy interval for radiation detected by the detecting section based on the matching relationship.

According to this configuration, radiation (such as, for example, $\gamma$ rays and $\beta$ rays) is detected using a plurality of detectors provided to have directivity characteristics that differ from each other. By suitably defining the relative placement of the plurality of detectors, for example, it is possible to provide the detectors with directivity characteristics that differ from each other. Alternatively, it is also possible to provide detectors with directivity characteristics that differ from each other by setting primary sensitivity directions of the detectors to differ from each other using, for example, a shielding member. Each detector is desirably constructed using a scintillator member. In this configuration, the detectors may be formed of a same material and in a same form, or different materials or different forms may be employed. In either case, it suffices to provide a direction dependency in the sensitivity characteristic of the detectors.

The calculating section described above calculates a plurality of sets of actual ratio information corresponding to a plurality of energy intervals based on a plurality of sets of detection data. The plurality of energy intervals may have a uniform interval width or may have nonuniform interval widths. For example, for an energy region which requires a detailed identification, a finer energy interval with a smaller interval width may be set (in this case, the energy interval is coarsely set for other regions). However, fundamentally, the individual energy interval which is a precondition for determining the actual ratio information and the individual energy interval which is a precondition for generating the plurality of response functions must be matched or conformed. The actual ratio information determined for each energy interval is calculated by determining mutual ratios for the plurality of individual counts corresponding to the plurality of detectors. For example, as will be described below, it is possible to determine a plurality of count ratios (a plurality of actual count ratios) by normalizing the plurality of individual counts with a sum of the individual counts, and to form actual ratio information as a combination or a sequence of the plurality of count ratios. In either case, it is desirable to calculate information related to a ratio of the counts reflecting a difference in directivity characteristics of the detectors for each energy interval. The individual count for the detector may be, for example, an integrated count, a count percentage, etc. in the energy interval.

On the other hand, a plurality of response functions are prepared in advance corresponding to the plurality of energy intervals. The response functions are desirably generated in advance based on experiments or simulations, and function as templates with which the actual ratio information is compared. In other words, the response function for each energy interval is a function representing theoretical ratio information which changes according to an incident direction of radiation. The theoretical ratio information is information which is compared with the actual ratio information, and is considered a theoretical value as opposed to an actual value. The generating section is formed as a storage which generates data representing the response functions, a calculating section which processes equations of the response functions, or other means.

The comparing section described above compares a plurality of items of actual ratio information corresponding to a plurality of energy intervals with a plurality of response functions corresponding to the plurality of energy intervals. More specifically, for each energy interval, the actual ratio information is compared with the theoretical ratio information for each incident direction represented by the response function. In this case, when a matching relationship is determined between particular actual ratio information and particular theoretical ratio information, that is, when an actual value and a theoretical value match, estimation of at least one of the incident direction and the energy interval based on the matching relationship is enabled. In other words, it is possible to identify an incident direction and/or an energy interval of an incident radiation based on attributes (incident direction corresponding to the theoretical ratio information and/or energy interval corresponding to the response function representing the theoretical ratio information) of the theoretical ratio information at the time when matching relationship is established. Here, it is preferable that the comparing section identifies both of the incident direction and the energy interval for the radiation detected by the detecting section.

As described, according to various aspect of the present invention, because it is not necessary to identify a peak of a spectrum and then apply a calculation process using the found peak, it is possible to apply the calculation process even when the peak is unclear, and a calculation process which does not depend on the peak identifying precision can be realized. In addition, because there is no need to delay the start of the calculation until the peak is clearly recognized on the spectrum, rapid calculations can be realized.

It is preferable that the actual ratio information for each energy interval includes a plurality of actual count ratios determined by normalizing the plurality of individual counts with a sum of the individual counts, and the theoretical ratio information according to the incident direction includes a plurality of theoretical count ratios to be compared with the plurality of actual count ratios. The plurality of actual count ratios (actual count ratio sequence) correspond to a sequence representing internal dividing ratios of the counts among the plurality of detectors. The plurality of theoretical count ratios (theoretical count ratio sequence) are a sequence which is contrasted or compared with the actual count ratio sequence.

It is preferable that the calculating section comprises a creating section which creates a plurality of spectra corresponding to the plurality of detectors based on the plurality of detection data, a first calculating section which sets a plurality of energy intervals for each of the plurality of spectra and determines, for each energy interval, a plurality of individual counts corresponding to the plurality of detectors, and a second calculating section which determines, for each energy interval, the plurality of actual count ratios by dividing the plurality of individual counts by a total count which is a sum of the individual counts. The generating section may be formed using a multi channel analyzer (MCA) or may be formed using another device (for example, a single channel analyzer (SCA)) which can calculate an integrated count for each energy interval. It is preferable that a plurality of analyzers operate in parallel, but it is also possible to operate a single analyzer in a time division manner. It is also possible to integrate the first calculating section and the second calculating section to form a single calculating section. This is also true for other sections. Each section may be realized using a dedicated hardware or as a software function.

It is preferable that the response function for each energy interval generated by the generating section is formed as an equation or a table which provides theoretical ratio information for each incident direction. It is preferable that the response function for each energy interval is generated in advance as a result of execution of a simulation in which radiation having a predetermined energy is virtually irradiated from each direction using a virtual model for the detecting section. A designated energy is preferably set as an energy at the center of each energy interval, and, for example, a γ ray having an photoelectric peak on the energy in the virtual model is virtually irradiated. In this case, the irradiation direction is varied continuously or at a predetermined pitch.

It is preferable that the plurality of detectors comprise n scintillator blocks (where $n \geq 3$) placed around a center axis in the detecting section. By providing three or more scintillator blocks along the circumferential direction, the directivity characteristics of the blocks can be differed, and the incident direction can be discriminated for radiations from all surroundings in the horizontal direction.

It is preferable that, when radiation from a plurality of sources having energies that differ from each other are incident on the detecting section, the comparing section determines a plurality of matching relationships corresponding to the plurality of radiations, and an incident direction and an energy interval are identified for each determined matching relationship. As described above, because actual ratio information corresponding to each energy interval is individually compared for the plurality of response functions corresponding to the plurality of energy intervals, even when radiation from a plurality of sources having energies which differ from each other are simultaneously incident, the radiations can be distinguished and handled separately. This is also true when radiation from a plurality of sources are incident from the same incident direction. When it is desired to distinguish among radiation from a plurality of sources even when radiation from a plurality of sources having the same energy (energy interval) are incident, another identification method may be further combined to the above-described configuration.

It is preferable that the radiation measurement apparatus further comprises a creating section which creates a chart by mapping a mark on a predetermined coordinate system based on the incident direction and the energy interval identified by the comparing section, and a displaying section which displays the chart. With the chart, it is possible to simultaneously and intuitively understand the incident direction and energy interval.

It is preferable that a circumferential direction in the predetermined coordinate system represents the incident direction and a radial direction in the predetermined coordinate system represents the energy interval. It is preferable that the chart creating section changes a display form of the mark according to dosage information. With this configuration, a magnitude of the dosage (or dosage rate) can be intuitively recognized at the same time. It is preferable that the dosage information represents a dosage calculated for an energy interval identified by the comparing section. It is preferable that the change of the display form of the mark includes at lease one of a size change, a shape change, a color phase change, and a brightness change. The chart displaying technique as described above can be applied in other radiation measurement devices which calculate and display an incident direction and energy (or energy interval) of radiation. In this case also, the advantages similar to those described above can be obtained.

According to another aspect of the present invention, there is provided a data processing method in a radiation measurement apparatus which comprises a detecting section having n detectors (where n≧3) provided to have horizontal directivity characteristics that differ from each other, the method comprising the steps of calculating, based on n detection data obtained using the n detectors and for each energy interval among m energy intervals (where m≧2), actual ratio information representing mutual ratios for n individual counts corresponding to the n detectors, generating, for each energy interval, a response function which provides theoretical ratio information according to an incident direction, and comparing m actual ratio information corresponding to the m energy intervals with m response functions corresponding to the m energy intervals, and identifying, when a matching relationship is determined between particular actual ratio information and particular theoretical ratio information, an incident direction and an energy interval for radiation detected by the detecting section based on the matching relationship.

It is preferable that the method further comprises the step of creating a chart by mapping a mark representing the identified incident direction and the identified energy interval on a polar coordinate system in which the incident direction is correlated to a circumferential direction and the energy interval is correlated to a radial direction.

As described, with the above-described configuration, it is possible to calculate either or both of an incident direction or an energy level of incident radiation, without identifying a peak on the spectrum. In addition, with the above-described configuration, it is possible to identify among radiation incident from a plurality of sources, even within radiation simultaneously incident. Moreover, with the above-described configuration, it is possible to realize a display method in which either or both of an incident direction or an energy level of incident radiation can be intuitively recognized.

BEST MODE FOR CARRYING OUT THE INVENTION

A preferred embodiment of the present invention will now be described with reference to the drawings.

Figure 1:
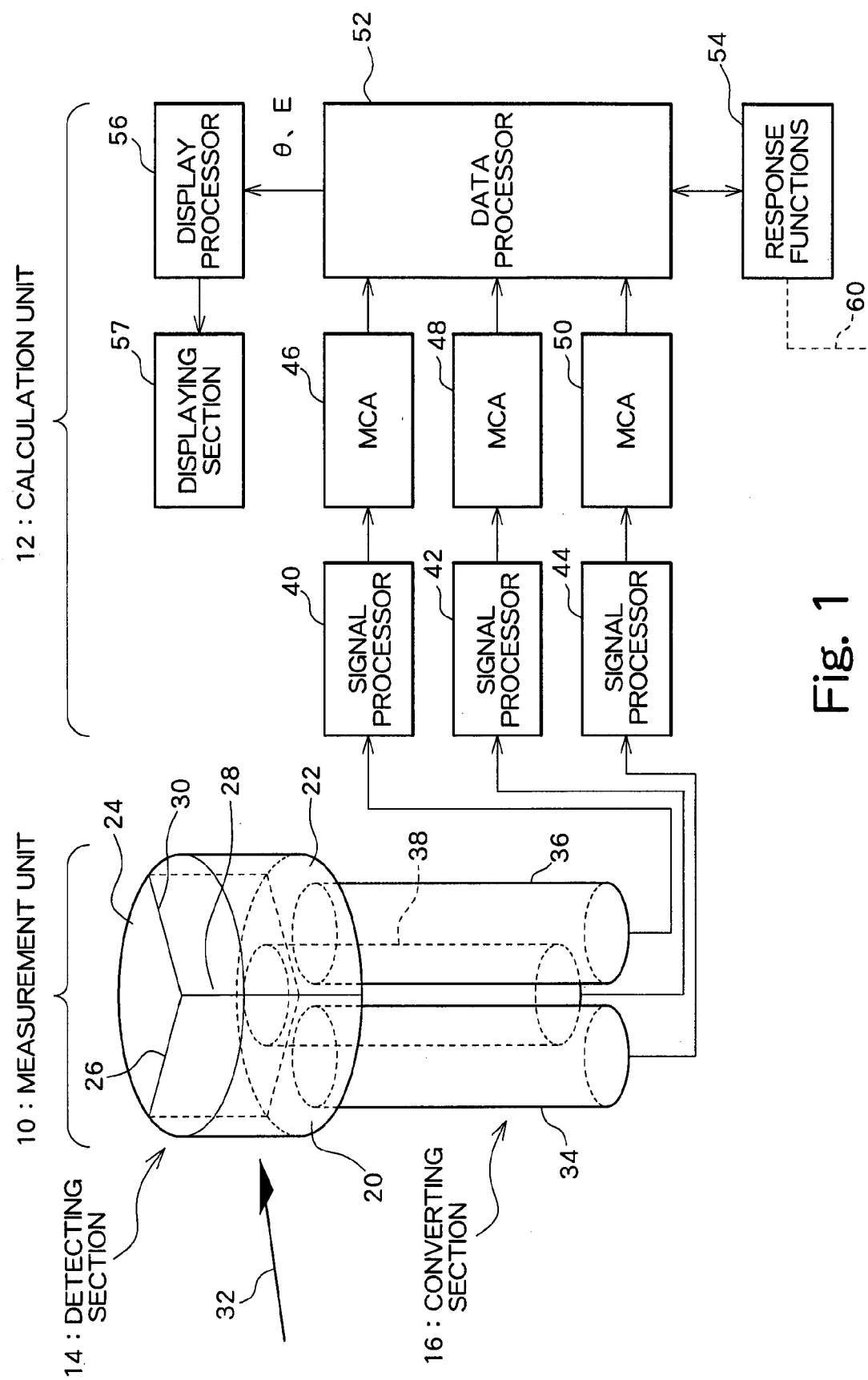
FIG. 1 is a block diagram showing a preferred embodiment of a radiation measurement apparatus according to the present invention.

FIG. 1 shows a preferred embodiment of a radiation measurement apparatus according to the present invention. A radiation measurement apparatus according to the present embodiment is formed as a monitoring post which continuously measures an environmental radiation (in particular, γ rays). The present invention may alternatively be applied to other radiation measurement apparatuses, such as survey meters.

In FIG. 1, the radiation measurement apparatus comprises a measurement unit 10 and a calculation unit 12. The measurement unit 10 comprises a detecting section 14 and a converting section 16. The detecting section 14 comprises in the present embodiment three scintillator blocks (three detectors) 20, 22, and 24. The three scintillator blocks 20, 22, and 24 are placed at uniform intervals around a vertical center axis of the detecting section 14 on a horizontal plane, and each of the scintillator blocks 20, 22, and 24 has a sector shape with an angle of 120 degrees seen from the top (or from the bottom). The detecting section 14 has an overall shape of a tube shape or a disk shape. A diameter of the detecting section 14 is, for example, 7.62 cm (3 inches) and a height of the detecting section 14 is, for example, 7.62 cm (3 inches).

Because the detecting section 14 is constructed in the above-described manner, the directivity characteristics of the scintillator blocks 20, 22, and 24 differ from each other. Specifically, when, for example, radiation is incident from a direction indicated by reference numeral 32, the sensitivity of the scintillator block 20 present at a front side is the highest with respect to the radiation, and the sensitivities of the scintillator blocks 22 and 24 present at a rear side are relatively lower because the scintillator block 20 is in front of the scintillator blocks 22 and 24. In this manner, when the three scintillator blocks 20, 22, and 24 are placed along the circumferential direction, the directivity characteristics of the scintillator blocks 20, 22, and 24 differ from each other because of the structure unique to the detecting section.

In the present embodiment, the scintillator blocks 20, 22, and 24 are formed of a same material and in a same form. Alternatively, it is also possible to form the scintillator blocks 20, 22, and 24 with materials which differ from each other or in forms which differ from each other. In either case, the plurality of detectors are formed such that the directivity characteristics of the plurality of detectors differ from each other. For example, it is possible to place the detectors with different primary sensitivity directions while providing the directivity to the plurality of detectors using a shielding material. In this case, the plurality of detectors can be placed along the vertical direction.

Reflective layers 26, 28, and 30 are provided among the three scintillator blocks 20, 22, and 24. Diffraction of light among the scintillator blocks 20, 22, and 24 is prevented by the reflective layers 26, 28, and 30. It is also possible to cover the entirety of the scintillator blocks 20, 22, and 24 except for the light emitting region at the lower surface with a reflective material.

The converting section 16 comprises three optical detectors (photomultiplier tube as a photoelectric converter) 34, 36, and 38 corresponding to the three scintillator blocks. Light receiving surfaces of the optical detectors 34, 36, and 38 are connected to lower surfaces of the corresponding scintillator blocks 20, 22, and 24. Therefore, when radiation is incident on a certain scintillator block and light emission is caused, the light is detected by the optical detector connected to the scintillator block. In the optical detector, the light signal is converted to an electrical signal.

It is also possible to provide a light guide or the like between the lower surfaces of the scintillator blocks 20, 22, and 24 and the light receiving surfaces of the optical detectors 34, 36, and 38, as necessary. In either case, it is preferable to form the measurement unit 10 such that the light generated in the scintillator block due to incidence of radiation is guided to the optical detector corresponding to the scintillator as effectively as possible.

Although the detecting section 14 and the converting section 16 in the measurement unit 10 are stored in a case, the case is not shown in FIG. 1. With the measurement unit 10 of the present embodiment, because there is no need to provide a mechanism which rotates the detecting section or a large shielding structure as in the related art, the size of the measurement unit 10 can be reduced and the weight of the measurement unit 10 can be reduced.

The calculating unit 12 will next be described. In the example configuration of FIG. 1, three signal processors 40, 42, and 44 and three multi channel analyzers (MCA) 46, 48, and 50 are provided corresponding to three radiation detectors (that is, three scintillator blocks 20, 22, and 24). Each of the signal processors 40, 42, and 44 comprises an amplifier which amplifies a signal which is output from the optical detectors 34, 36, and 38, an A/D converter which converts the amplified signal from an analog signal to a digital signal, and other necessary circuits. The MCAs 46, 48, and 50 are circuits which generate three spectra based on signals obtained using three detectors (detection data). In other words, the MCAs 46, 48, and 50 function as spectrum generators. Alternatively, three single channel analyzers (SCA) may be used in place of the MCAs. It is also possible to provide a circuit which determines a count for each energy interval, in place of forming a complete spectrum. From a schematic point of view, such a circuit corresponds to a spectrum generating circuit and a spectrum analyzing circuit.

The data processor 52 comprises, for example, a microprocessor. Specific processes of the data processor 52 will be described later in detail. The data processor 52 of the present embodiment sets a plurality of energy intervals for a plurality of spectra, applies a predetermined calculation for each energy interval, and compares the calculation result with response functions (to be described later), to identify an incident direction θ and energy (energy interval) E of the incident radiation. Here, the response functions are stored in a storage 54 connected to the data processor 52. As will be described later, the response functions can be determined by executing a predetermined simulation. Reference numeral 60 shows storage of the data representing the response functions to the memory 54.

When the incident direction θ and energy (energy interval) E of the incident radiation are determined in the data processor 52 as described above, a display processor 56 executes a predetermined display process for providing these information to the user in an easily understandable manner. As will be described later, in this case, a predetermined chart is generated and is displayed on a displaying section 57. Alternatively, it is also possible to output the information of the incident direction θ and energy E determined by the data processor 52 to an external device through a network.

Figure 2:
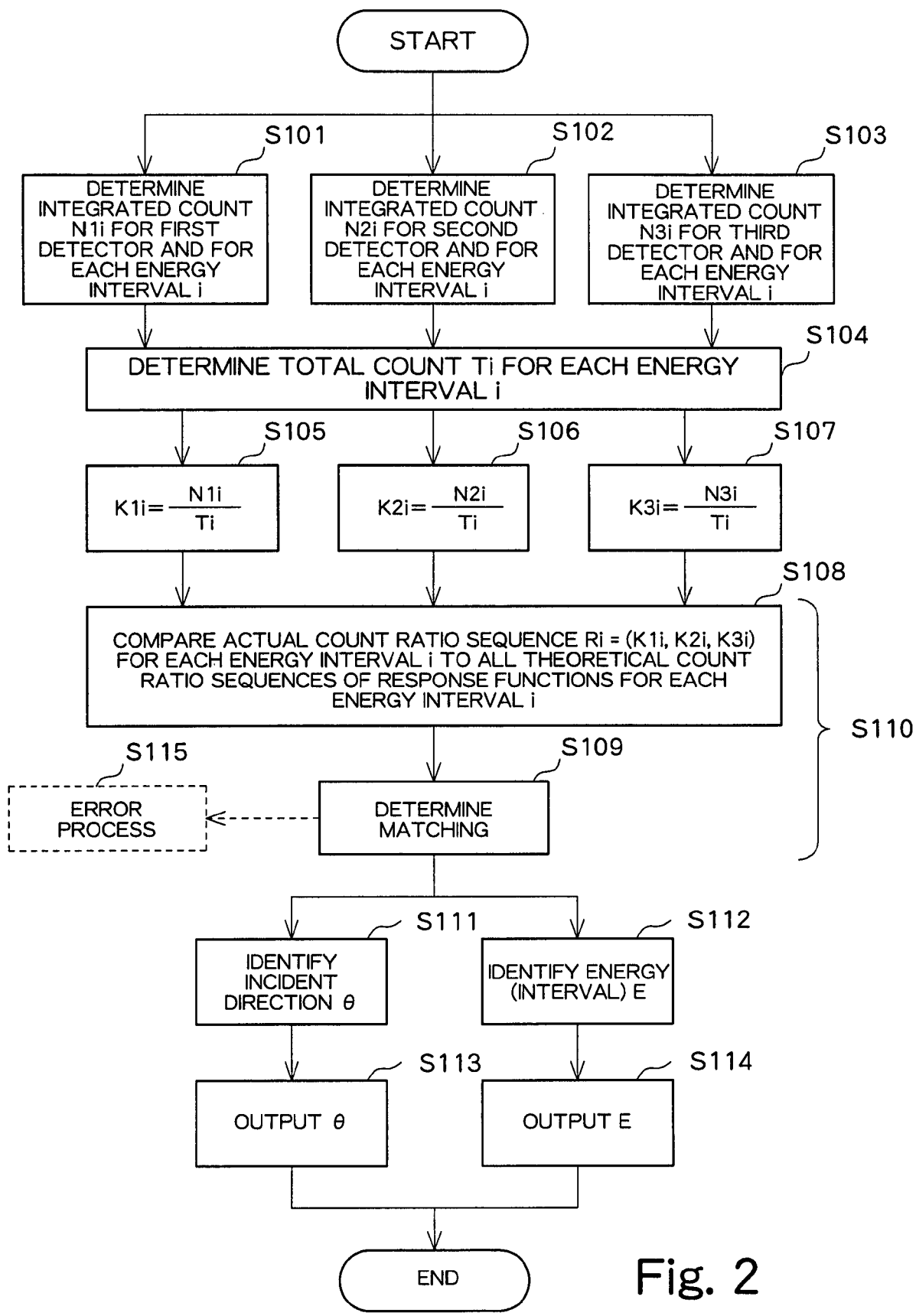
FIG. 2 is a flowchart showing a process content of a data processor shown in FIG. 1.

Next, a process content of the data processor 52 shown in FIG. 1 will be described in detail. FIG. 2 shows a flowchart of the content of the processes in the data processor 52. This flowchart will be described with reference to FIGS. 3-10.

S101, S102, and S103 represent three steps corresponding to the three detectors, and in each step a plurality of energy intervals are set for a spectrum generated for each detector, and integrated counts $N1_i$, $N2_i$, and $N3_i$ are determined for each energy interval i. Here, N1, N2, and N3 represent integrated counts for the detectors, and the index i is a positive integer (1, 2, 3, 4, and 5) indicating a number for an energy interval.

Figure 3:
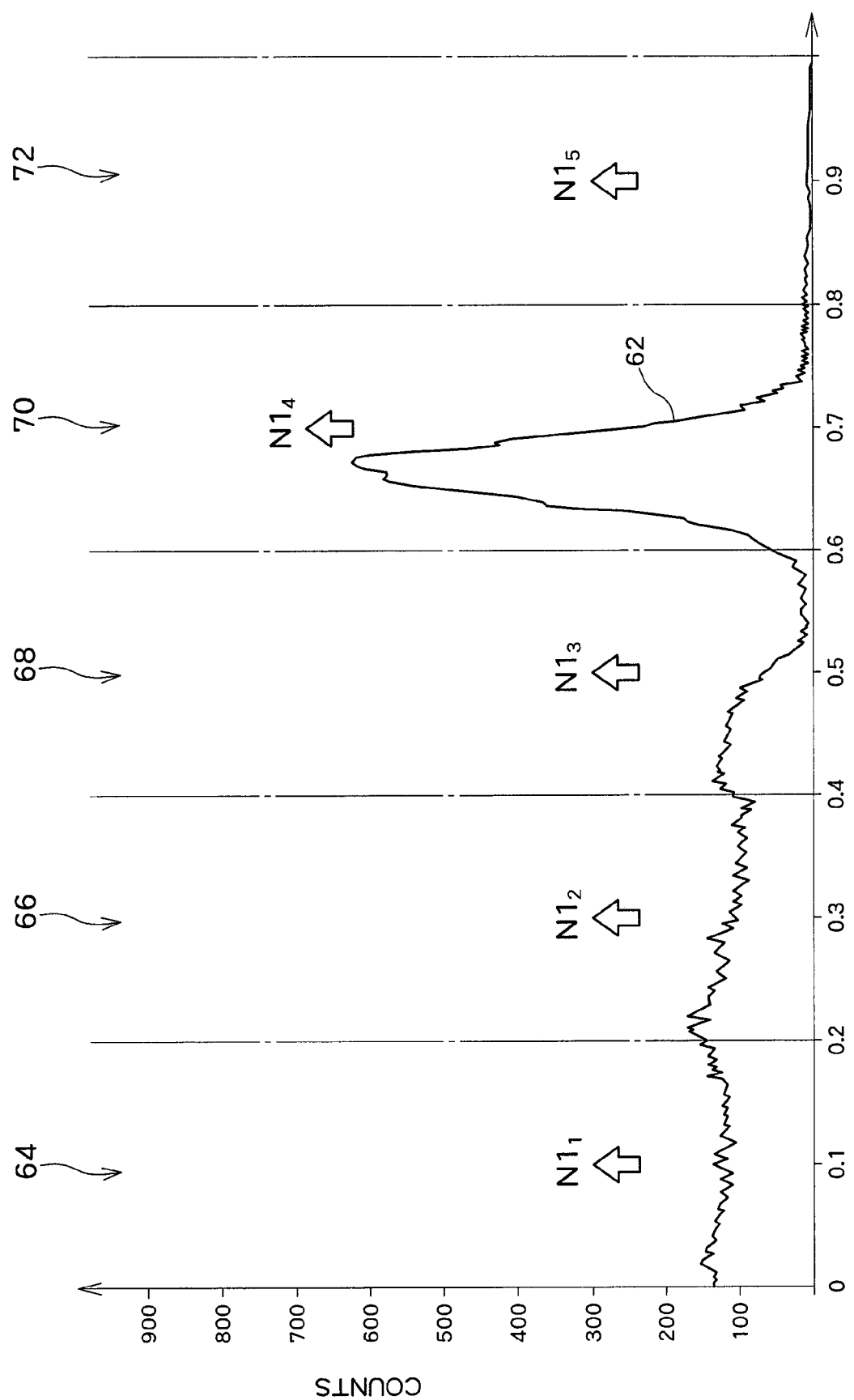
FIG. 3 is a diagram for explaining setting of a plurality of energy intervals for a spectrum.

Processes of S101, S102, and S103 will now be described with reference to FIG. 3. FIG. 3 shows, as an example, a spectrum 62 which is based on detection data obtained from a first detector. A plurality of energy intervals 64-72 are set for the spectrum 62 as shown in FIG. 3. The energy intervals 64-72 may have the same interval width or different interval widths. In the present embodiment, a same interval width is set for all of the energy intervals 64-72 and the interval width is 200 keV. This is only exemplary, and, it is possible, for example, to set, if there is an energy region for which a more detailed identification is desired, a fine energy interval in this energy region and a coarse energy interval for the other regions.

In the present embodiment, an integrating process for counts is executed based on the spectrum for each of the energy intervals 64-72. That is, integrated counts are determined. The integrated counts are represented in FIG. 3 with $N1_1$-$N1_5$. Although a peak of the spectrum 62 is present in the energy interval 70, in the method of the present embodiment, the incident radiation can be analyzed without differentiating or identifying such a peak. Although FIG. 3 only shows a spectrum process for the first detector, similar processes are executed for the spectra for the other detectors.

In the present embodiment, when the above-described processes of S101, S102, and S103 are executed for the three detectors, a result as shown in FIG. 4(A) can be obtained. Here, reference numeral 74 represents a result when the spectrum is processed for the first detector, that is, the reference numeral 74 indicates five integrated counts $N1_1$-$N1_5$ corresponding to five energy intervals. Reference numeral 76 indicates five integrated counts $N2_1$-$N2_5$ corresponding to five energy intervals as a result of processing of the spectrum for the second detector. Reference numeral 78 indicates five integrated counts $N3_1$-$N3_5$ corresponding to five energy intervals as a result of processing of the spectrum for the third detector.

Referring again to FIG. 2, in S104, a total count $T_i$ is determined as a sum of three integrated counts for each energy interval i (for example, $T_1 = N1_1 + N2_1 + N3_1$). In S105, S106, and S107, count ratios corresponding to the integrated counts are determined by dividing the three integrated counts determined for each energy interval by the total count $T_i$. This process will now be described with reference to FIG. 4.

FIG. 4(B) shows a result of execution of S104-S107 as described above. For the energy interval of 0 keV-200 keV, as shown in FIG. 4(A), when three integrated counts $N1_1$, $N2_1$, and $N3_1$ corresponding to the three detectors are divided (normalized) by the sum $T_1$ (=$N1_1$+$N2_1$+$N3_1$), three count ratios $K1_1$, $K2_1$, and $K3_1$ are determined as shown in FIG. 4(B). Similarly, for other energy intervals also, a count ratio is determined for each integrated count by normalization calculation. With this process, 15 count ratios (refer to reference numerals 80, 82, and 84) corresponding to three detectors and five energy intervals are determined, as shown in FIG. 4(B). The three count ratios for each energy interval represent a sensitivity difference among the three detectors or a difference in detection efficiency in the three detectors, that is, an internal dividing ratio with respect to the total count in each energy interval.

Referring again to FIG. 2, in S108, a process is executed to compare the three count ratios $R_i$ for each energy interval i (that is, actual count ratio sequence) with response functions for each energy interval i (more specifically, all theoretical count ratio sequences). This process will now be described with reference to FIGS. 4(C) and 4(D).

As shown in FIG. 4(C), for the energy interval of 0 keV-200 keV, three count ratios $K1_1$, $K2_1$, and $K3_1$ are determined in the energy interval and an actual count ratio sequence $R_1$ is defined as a combination of the count ratios. Similarly, actual count ratio sequences $R_2$-$R_5$ are defined for the other energy intervals. As shown in FIG. 4(D), the actual count ratio sequence is compared with the response functions for each energy interval (refer to reference numerals 70-1-70-5).

Figure 4:
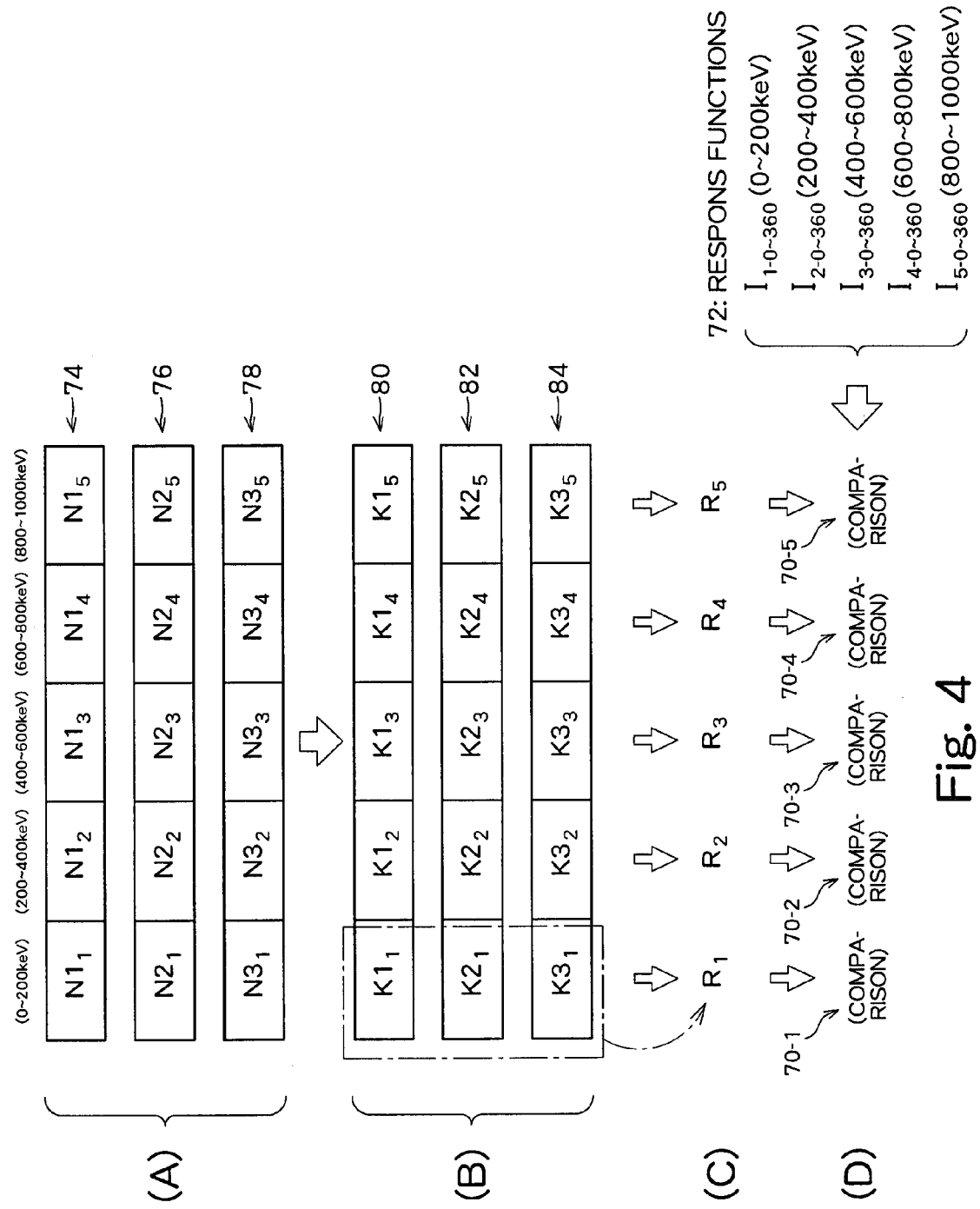
FIG. 4 is a conceptual diagram for explaining a process content of a data processor.

In the present embodiment, five response functions corresponding to five energy intervals are prepared in advance (refer to reference numeral 72). In the present embodiment, the response function is a function obtained by executing a simulation, which will be described later in more detail, and represents a theoretical count ratio sequence in a range of 0 degree-360 degrees. In FIG. 4, five response functions are shown with $I_{1-0\sim360}$, $I_{2-0\sim360}$, $I_{3-0\sim360}$, $I_{4-0\sim360}$, and $I_{5-0\sim360}$. For example, in the energy interval of 0 keV-200 keV, the actual count ratio sequence $R_1$ is compared with the response function $I_{1-0\sim360}$. This is similar for the other energy intervals.

Figure 5:
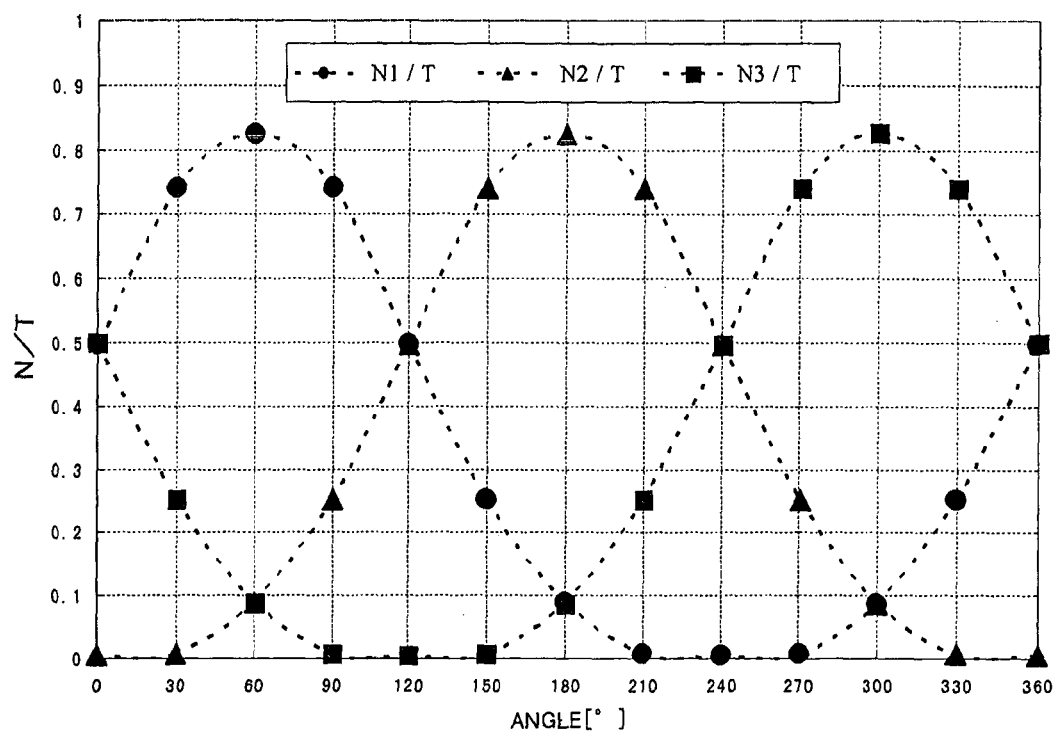
FIG. 5 is a diagram showing a first response function.
Figure 6:
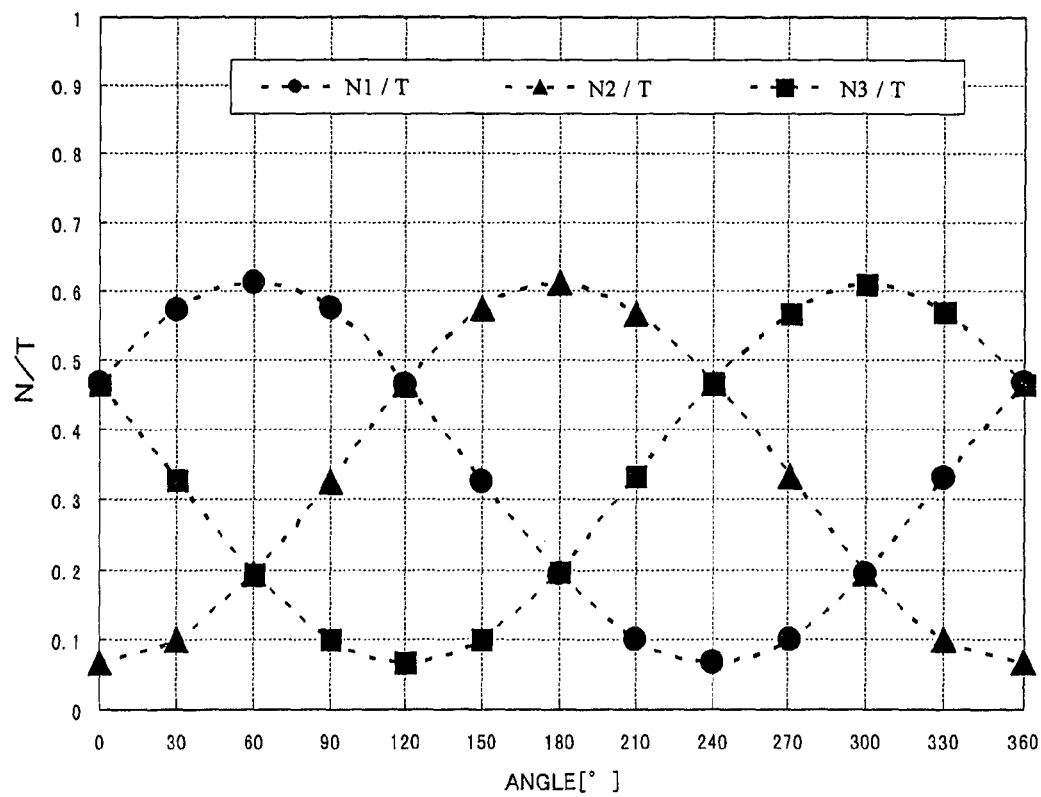
FIG. 6 is a diagram showing a second response function.
Figure 7:
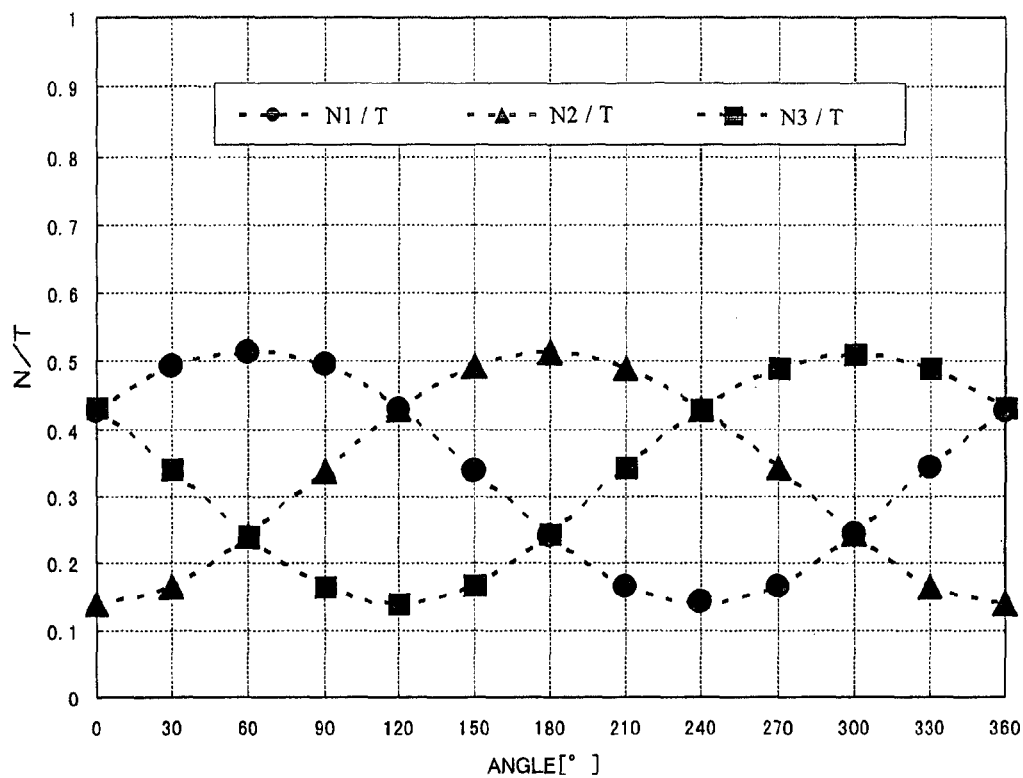
FIG. 7 is a diagram showing a third response function.
Figure 8:
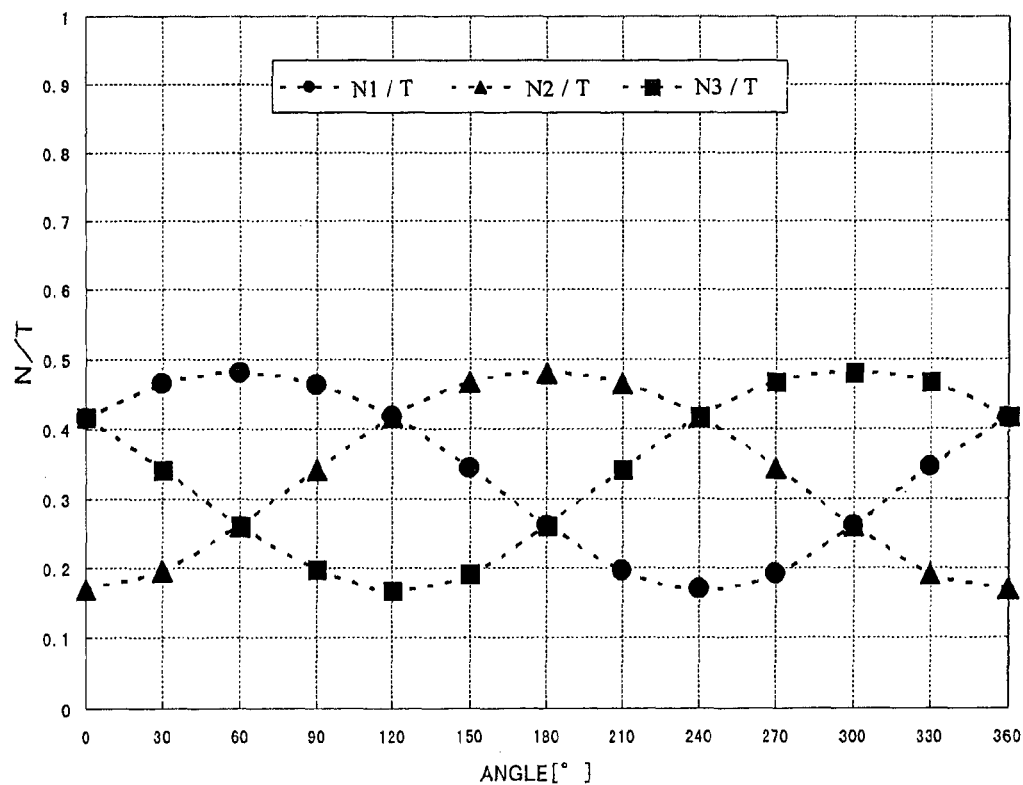
FIG. 8 is a diagram showing a fourth response function.
Figure 9:
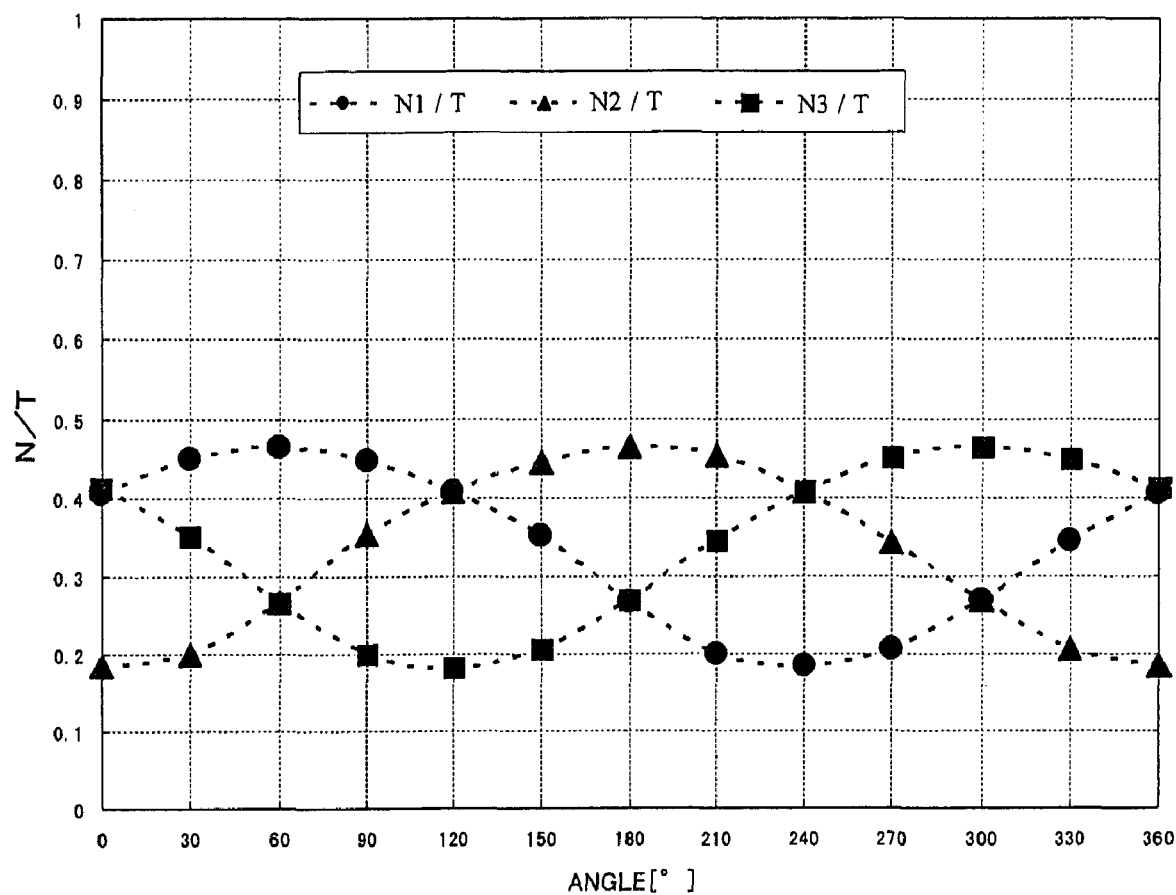
FIG. 9 is a diagram showing a fifth response function.

FIGS. 5-9 show first to fifth response functions corresponding to the five energy intervals. FIG. 5 shows a first response function for the energy interval of 0 keV-200 keV, FIG. 6 shows a second response function for the energy interval of 200 keV-400 keV, FIG. 7 shows a third response function for the energy interval of 400 keV-600 keV, FIG. 8 shows a fourth response function for the energy interval of 600 keV-800 keV, and FIG. 9 shows a fifth response function for the energy interval of 800 keV-1000 keV. In each of these figures, the horizontal axis represents an angle (corresponding to an incident direction) and the vertical axis represents the theoretical count ratio. Here, a line shown with a circular symbol (dotted line) shows a change of the theoretical count ratio for the first detector, a line shown with a triangular symbol (dotted line) shows a change of the theoretical count ratio for the second detector, and a line drawn with quadrangular symbols (dotted line) shows a change of the theoretical count ratio for the third detector.

The theoretical count ratio is determined by applying a calculation process similar to the above on a result of execution of simulation. In other words, as will be described later, a virtual γ ray having an energy peak at a center of individual energy interval is irradiated to a virtual model of the detecting section. During this process, the irradiation direction (angle) of the γ radiation is varied. In this manner, three spectra corresponding to the three detectors are obtained for each energy interval and for each irradiation direction. A plurality of energy intervals are set for the spectra, and, for each energy interval, three integrated counts N1, N2, and N3 corresponding to the three detectors are determined, and the integrated counts are normalized with the sum T. With this process, a plurality of theoretical count ratios (N1/T, N2/T, and N3/T) are determined. The five response functions are functions in which these ratios are plotted.

As shown in FIGS. 5-9, in a response function corresponding to each energy interval, the three theoretical count ratios vary in a manner similar to a sine curve according to the angle. As is clear from mutual comparison among FIGS. 5-9, when the energy becomes high, the transmitting power of the radiation is increased, and the differences among the theoretical count ratios of the three detectors are reduced. In each case, a theoretical count ratio sequence (a group of three theoretical count ratios) which differs for each energy interval and for each direction is identified in advance and is used as the response functions.

In FIG. 2, in the above-described S108, for each energy interval i, a process to compare the actual count ratio sequence $R_i$ with the response function is executed and a matching determination is executed in S109. More specifically, it is judged as to whether or not the actual count ratio sequence matches the theoretical count ratio sequence. In this case, it is possible to employ, for example, a correlation calculation or the like, and to execute the matching determination when the correlation value falls within a certain range. Alternatively, it is also possible to set a range for executing the matching determination for each theoretical count ratio and to execute the matching determination based on whether or not the actual count ratio belongs to the range.

When there is no theoretical count ratio sequence which matches the actual count ratio sequence, it is judged that there is no incidence of radiation of a certain level or higher which is to be measured. In this case, the incidence is judged as an incidence of natural radiation (environmental radiation). When, on the other hand, radiation having the same energy is incident from a plurality of directions, the calculation cannot be appropriately executed, and a problem occurs in the judgment result, it is possible to execute an error process in S115 in FIG. 2, to generate, for example, an alarm. In the radiation measurement apparatus of the present embodiment, as long as the energies differ, even when radiation from a plurality of sources are simultaneously incident from a same direction or different directions, each radiation can be identified and the incident direction and the energy (energy interval) can be determined for each radiation.

In the configuration shown in FIG. 2, the steps S108 and S109 need not be sequentially executed, and, alternatively, these steps may be executed simultaneously, as shown by S110.

Figure 10:
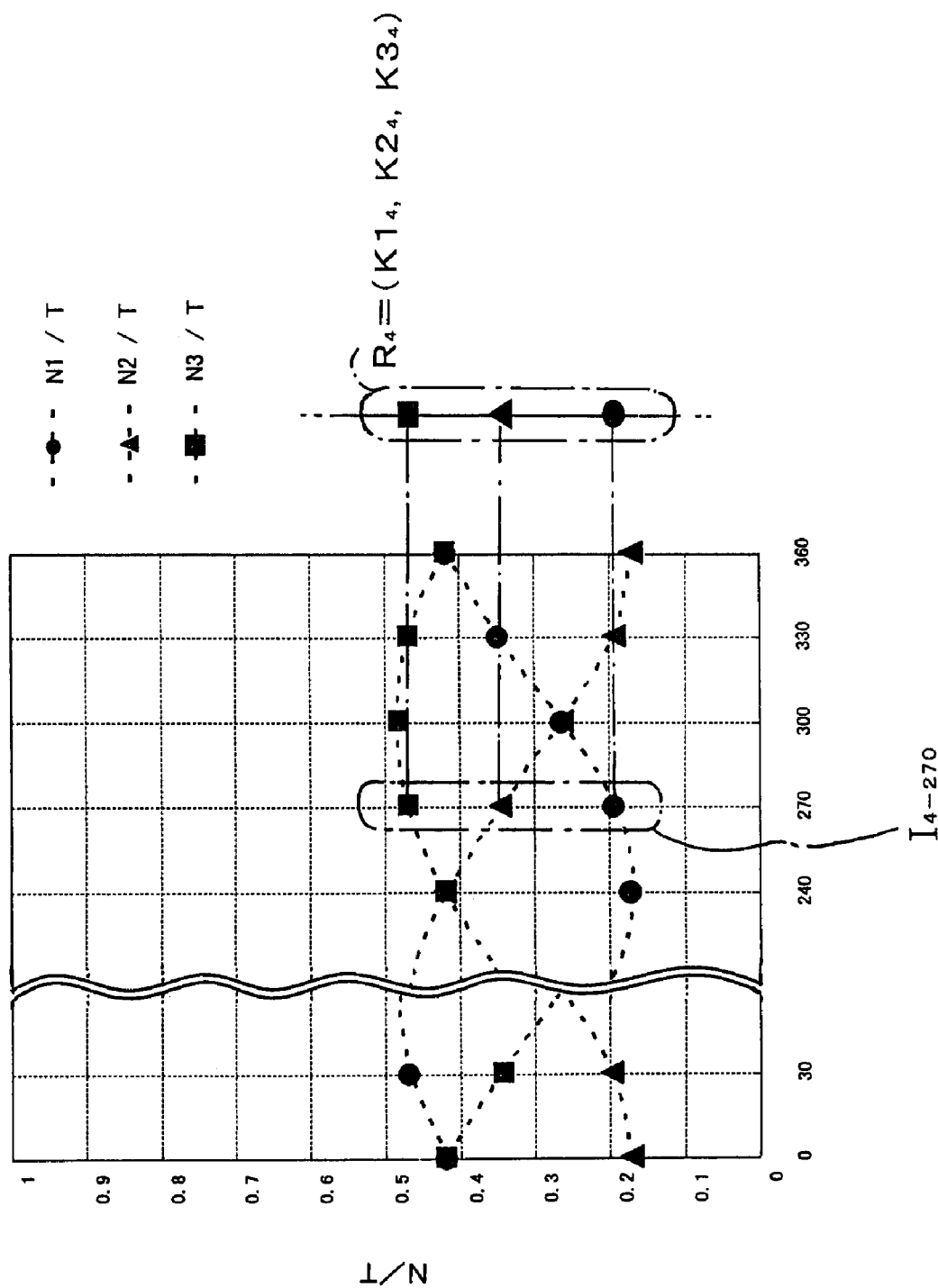
FIG. 10 is a diagram showing matching of a sequence of actual count ratios and a sequence of theoretical count ratios.

FIG. 10 shows an example when a matching determination is established. In the example of FIG. 10, $R_4$ indicates the actual count ratio sequence calculated for the fourth energy interval (600 keV-800 keV), and comprises three actual count ratios $K1_4$, $K2_4$, and $K3_4$. The actual count ratio sequence $R_4$ is compared with the fourth response function corresponding to the energy interval. In the case of FIG. 10, the theoretical count ratio sequence $I_{4-270}$ corresponding to an angle of 270 degrees matches the actual count ratio sequence $R_4$. When such a matching relationship is found, the incident direction of the radiation can be identified by reading an angle (270 degrees) as an attribute of the theoretical count ratio sequence $I_{4-270}$ in the matching relationship. In addition, by reading an energy interval (600 keV-800 keV) as an attribute of the response function for which the matching relationship is established, it is possible to identify the energy interval of the incident radiation. When radiation from a plurality of sources having energies which differ from each other are simultaneously incident, a plurality of matching relationships would be established for a plurality of energy intervals. For each of the matching relationships, the incident direction and the energy interval can be identified.

S111 and S112 in FIG. 2 show identification of the incident direction θ and identification of energy interval E as described above. In S113 and S114, information of the identified incident direction θ and information of the identified energy interval E are output.

As will be described below, response functions are generated using a simulation of irradiation of γ rays having a photoelectric peak at a center of each energy interval. Because the response functions are generated in such a manner, when a matching relationship is determined between the actual count ratio sequence and the theoretical count ratio sequence, the actual count ratio sequence corresponds to three peaks in three spectra corresponding to the three detectors. However, in the present embodiment, fundamentally, the actual count ratio sequence comparison is executed in all energy intervals, and there is no need to identify a peak in each spectrum. In other words, although the peak may be used as a consequence, there is no need to identify the peak during the calculation process. Therefore, even when the peak may not be clear on the spectrum, the incident direction and the energy interval can be precisely determined for an incident radiation.

Figure 11:
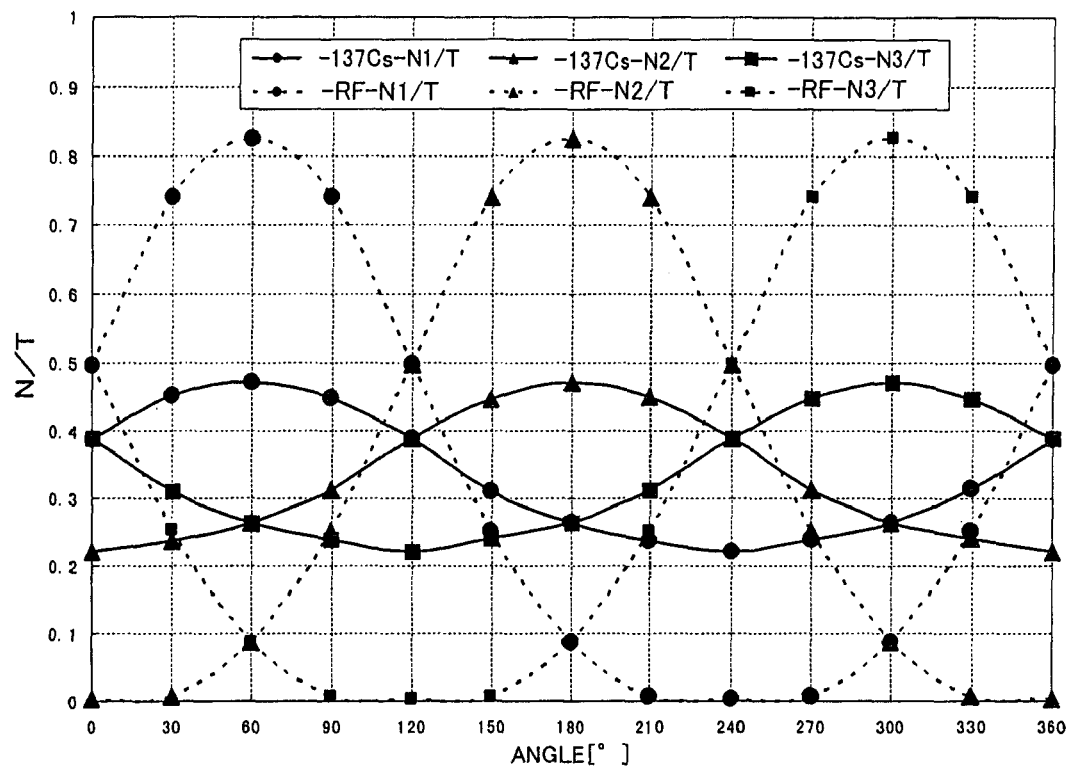
FIG. 11 is a diagram showing a first response function and a first function showing a demonstration result.
Figure 12:
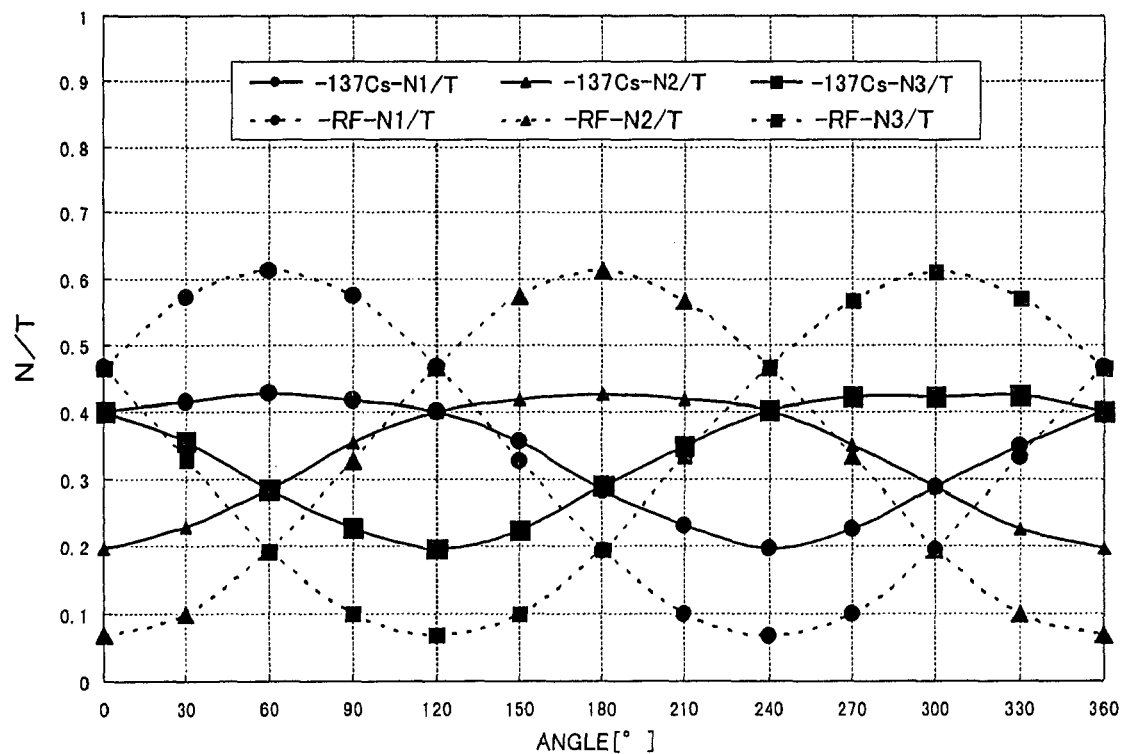
FIG. 12 is a diagram showing a second response function and a second function showing a demonstration result.
Figure 13:
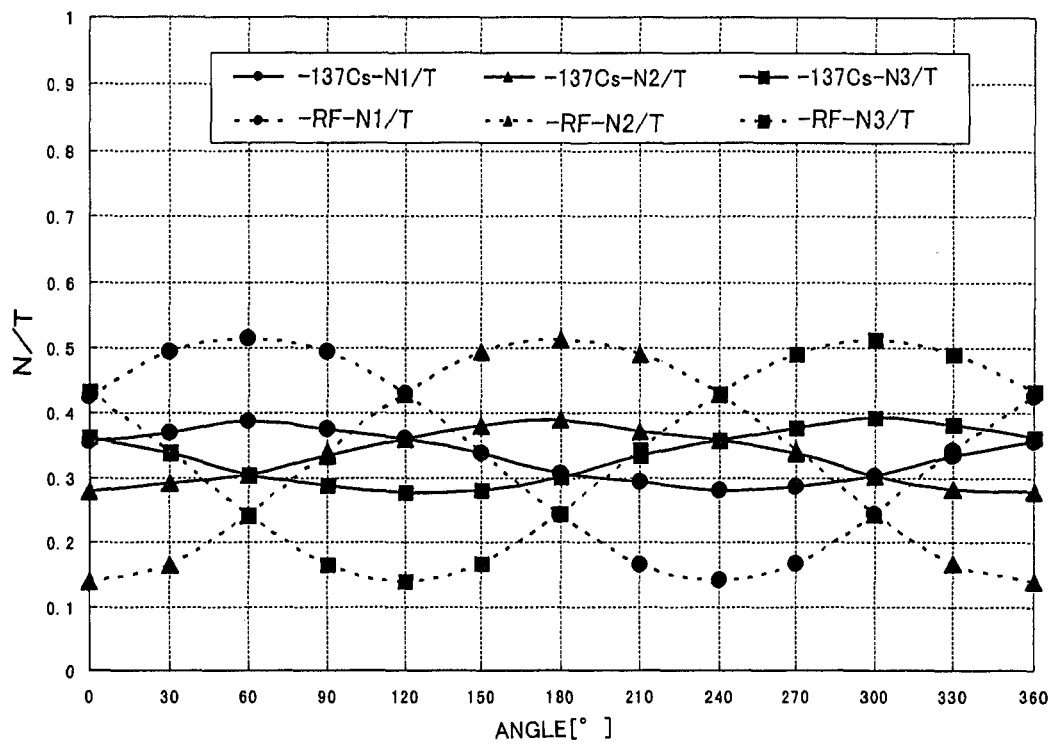
FIG. 13 is a diagram showing a third response function and a third function showing a demonstration result.
Figure 14:
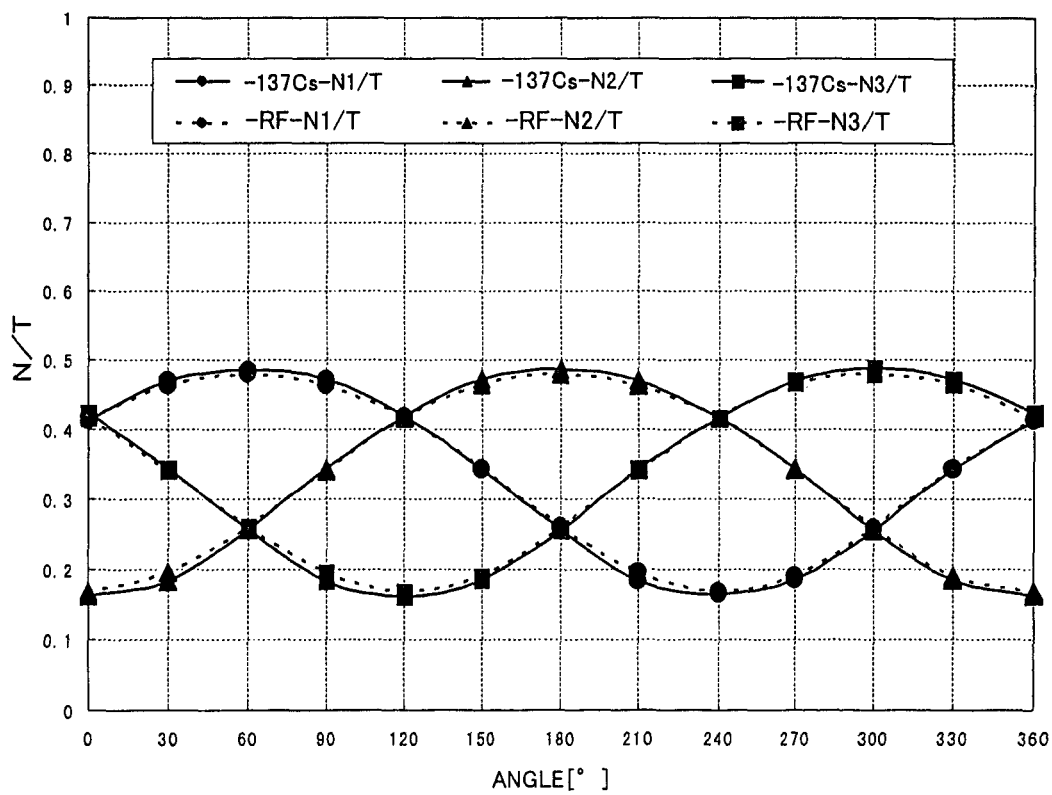
FIG. 14 is a diagram showing a fourth response function and a fourth function showing a demonstration result.
Figure 15:
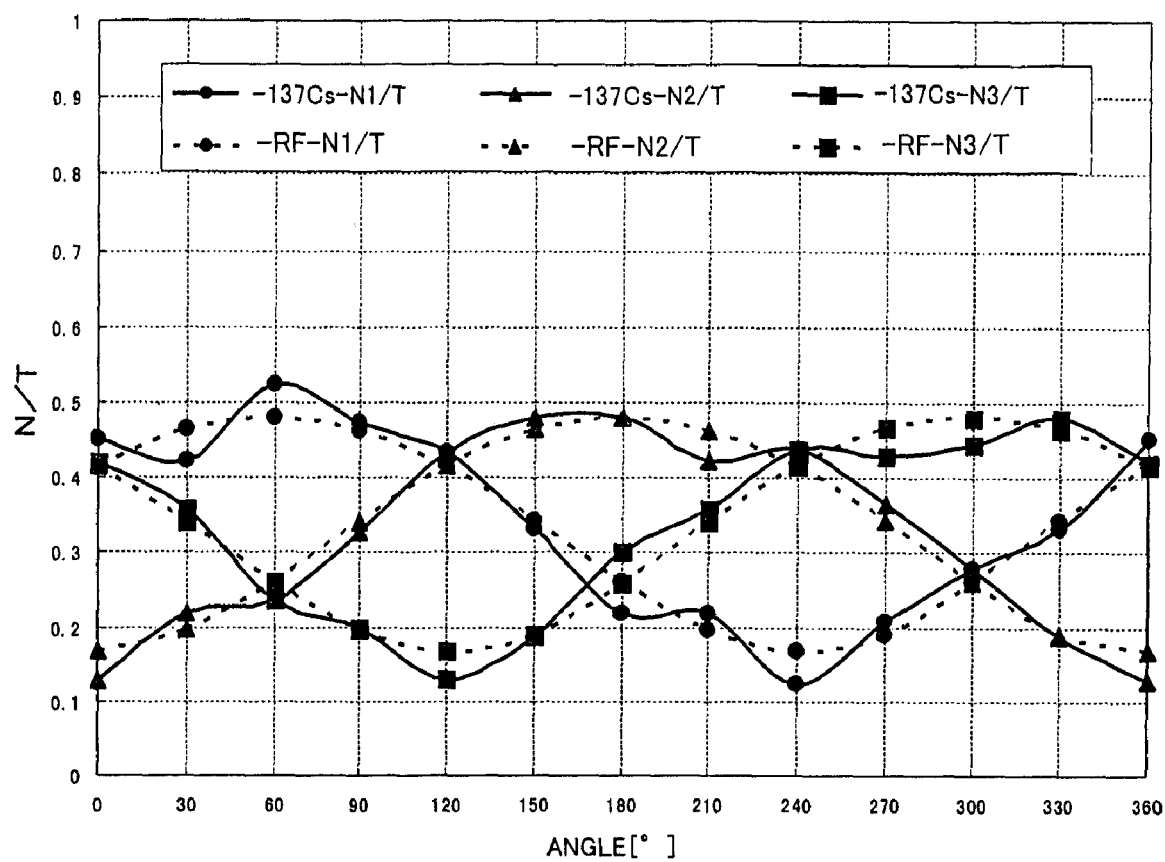
FIG. 15 is a diagram showing a fifth response function and a fifth function showing a demonstration result.

An example of the results of a simulation of a method according to the present embodiment will next be described with reference to FIGS. 11-15. FIG. 11 shows a response function (refer to FIG. 5) and a simulation result for the energy interval of 0 keV-200 keV, FIG. 12 shows a response function (refer to FIG. 6) and a simulation result for the energy interval of 200 keV-400 keV, FIG. 13 shows a response function (refer to FIG. 7) and a simulation result for the energy interval of 400 keV-600 keV, FIG. 14 shows a response function (refer to FIG. 8) and a simulation result for the energy interval of 600 keV-800 keV, and FIG. 15 shows a response function (refer to FIG. 9) and a simulation result for the energy interval of 800 keV-1000 keV. In each of these figures, a dotted line indicates a change of the theoretical count ratio sequence, that is, a response function (RF). The response functions are identical to those shown in FIGS. 5-9. A solid line, on the other hand, indicates a simulation result using a virtual radiation source (137 Cs) which radiates γ rays having a photoelectric peak at 662 keV. More specifically, in the simulation, the irradiation direction of the γ radiation is rotated around the detecting section which is a virtual model, and the change of the count ratio sequence (corresponding to the actual count ratio sequence) is shown in each figure with a solid line. Here, a circular symbol on each solid line represents a count ratio corresponding to the first detector, a triangular symbol represents a count ratio corresponding to the second detector, and a quadrangular symbol represents a count ratio corresponding to the third detector. As the count ratios are obtained as a result of the simulation process described, these are simulated, not measured, ratios, but they may be used as if they were actual count ratios.

Because the peak energy of the incident radiation is 662 keV, the radiation falls within the energy interval of 600 keV-800 keV. Because of this, as shown in FIG. 14, the count ratio sequence (actual count ratio sequence) in the simulation matches the theoretical count ratio for all directions for this energy interval. On the other hand, for the other energy intervals, no matching relationship is established in any direction. In other words, with the method of the present embodiment, when radiation is detected, the energy interval can be properly determined and the direction of emission can be properly determined for the incident radiation.

Figure 16:
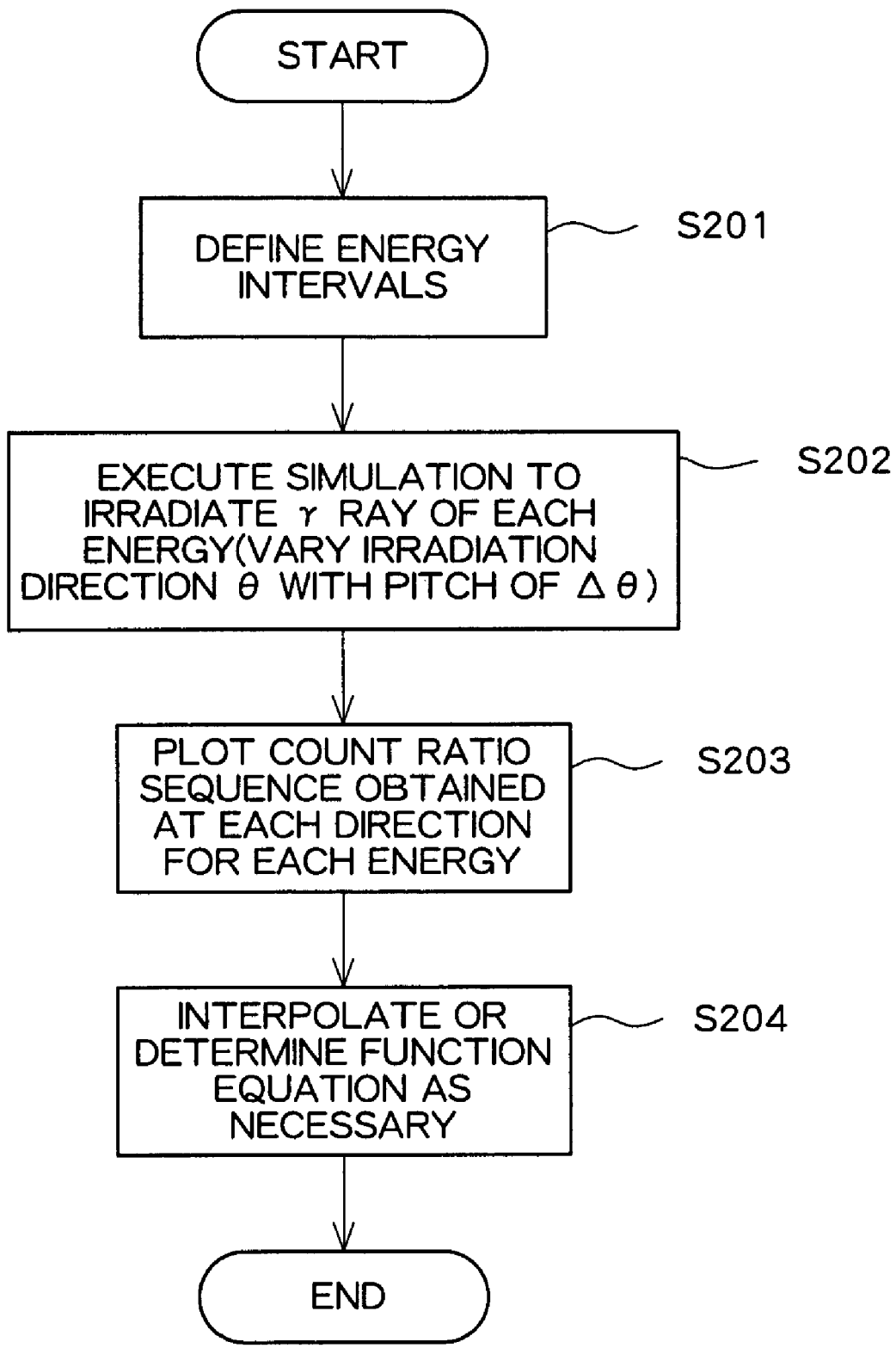
FIG. 16 is a flowchart showing a process of generating a response function.

The flowchart in FIG. 16 shows a method for generating the above-described response functions. In the present embodiment, the response functions are generated using a known electromagnetic cascade Monte Carlo simulation (EGS).

In S201, a plurality of energy intervals are defined. In the present embodiment, five energy intervals are set with an interval width of 200 keV as described above, but it is sufficient that the plurality of energy intervals related to the generation of the response functions and the plurality of energy intervals during analysis of the spectrum match, and, thus, the interval widths of the energy intervals need not be set identical to each other.

At S202, a structure of the radiation detecting section shown in FIG. 1 is geometrically defined as a virtual model, and a simulation is executed in which γ rays having a predetermined energy are irradiated from around the radiation detecting section which is modeled. In this case, for each energy interval, γ radiation having a peak energy at a center of the energy interval is irradiated. In addition, the irradiation direction is varied within a range of 0 degree-360 degrees. Here, the irradiation direction may be continuously varied, or may be varied with a pitch of Δθ. A Δθ of 30 degrees is set for the response functions shown in FIGS. 5-9. As a result of execution of S202, three spectra corresponding to three detectors are obtained for each energy and for each direction.

In S203, a plurality of energy intervals are set for the three spectra obtained for each energy and for each direction, and integrated counts are determined on the three spectra for each energy interval. By dividing the three integrated counts by the sum of the integrated counts, three count ratios (theoretical count ratios) are determined. Each of the count ratios forms a part of the count ratio sequence (theoretical count ratio sequence). The theoretical count ratio sequence determined for each energy interval and for each direction is plotted on a coordinate prepared for each energy interval. In S204, an interpolation process is executed for a plurality of points plotted on the coordinate as necessary, so that the response function can be determined. In this process, the response function may be defined as a sequence of numerical values or as an equation. In either case, by executing the processes shown in FIG. 16, the plurality of response functions corresponding to the plurality of energy intervals shown in FIGS. 5-9 can be generated in advance.

As descried, by considering various cases in which γ radiation of various energy levels is irradiated from various directions prior to actual measurement, and storing a set of theoretical values (response functions) by measurement of these cases, it is possible, when an actual measurement value is actually obtained, to match the actual measurement value with the set of the theoretical values so that a theoretical value having a matching relationship can be identified and the incident direction and energy interval as attributes of the theoretical value can be estimated.

Therefore, as long as the matching relationship can be properly determined, even when radiation emitted from a plurality of sources is simultaneously incident from various directions, it is possible to differentiate among the sources and measure each radiation. However, when radiation from a plurality of sources belonging to the same energy interval are simultaneously incident, it may not be possible to properly compare the actual measurement value and the theoretical value. In consideration of such a case, it is possible to execute an error processing in order to further improve the reliability of the determination.

The data processor shown 52 in FIG. 1 also has a function of calculating a dosage over an entire energy range and a dosage for each energy interval based on the detection data obtained by one or a plurality of the detectors. For example, when a dosage corresponding to the entire energy range is to be calculated, one of the three spectra may be selected and the dosage may be determined based on the selected spectrum. This is similar for the calculation of the dosage for each energy interval. Alternatively, it is also possible to consider all spectra, apply a weighted addition process or the like, and calculate the dosage.

Figure 17:
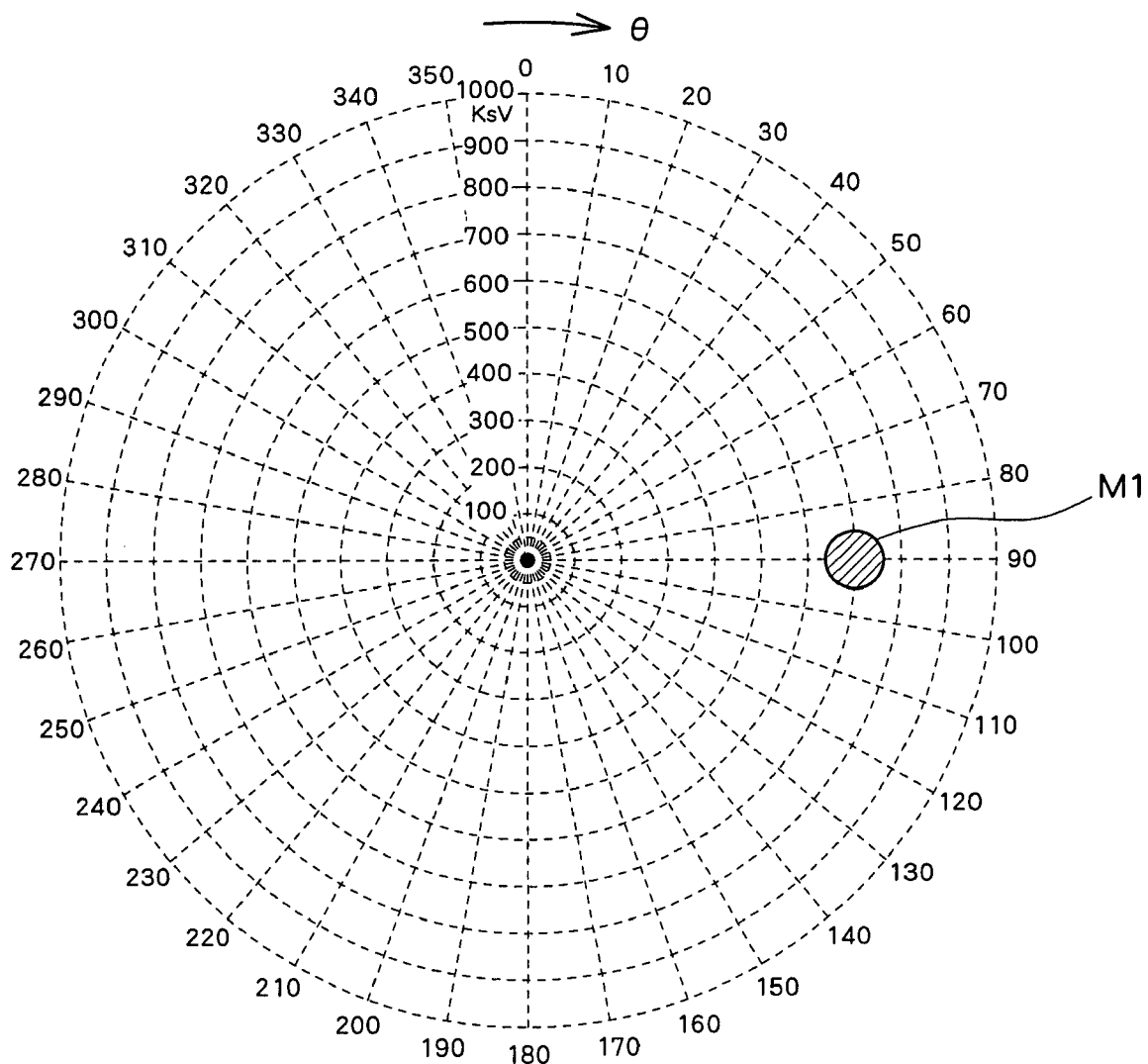
FIG. 17 is a diagram showing a first example display.
Figure 18:
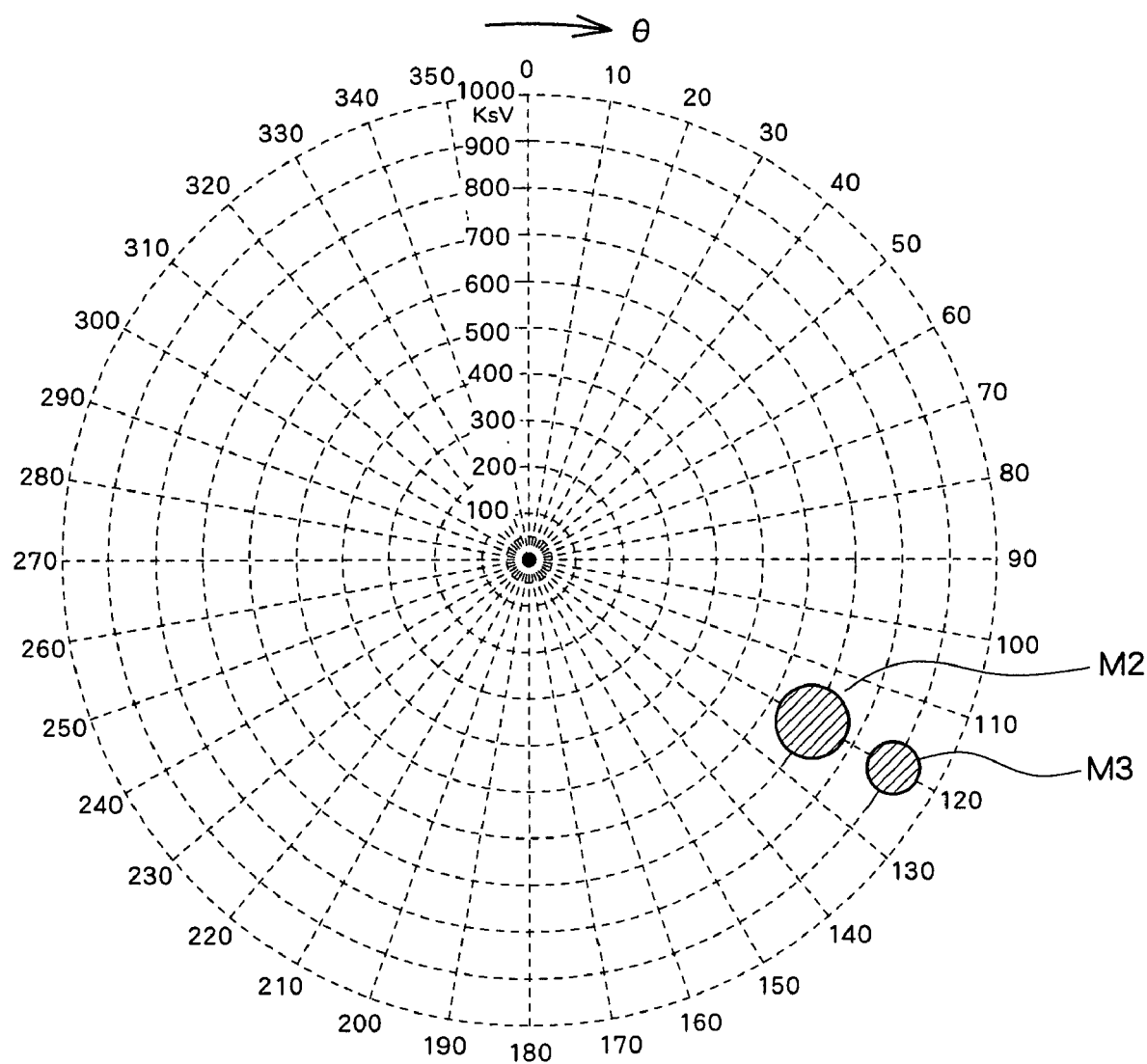
FIG. 18 is a diagram showing a second example display.
Figure 19:
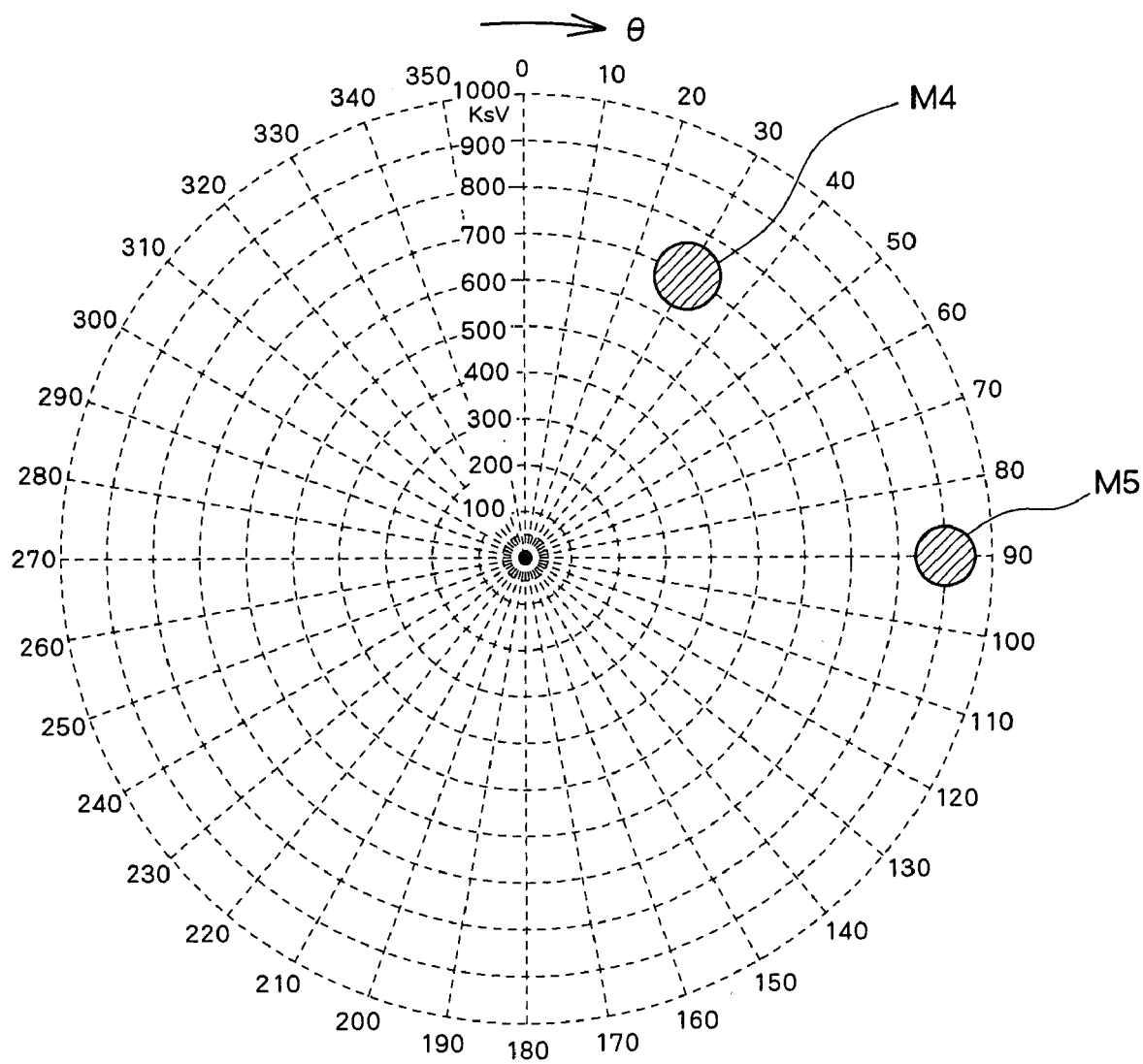
FIG. 19 is a diagram showing a third example display.

Next, an example process of the display processor 56 shown in FIG. 1 will be described. FIGS. 17-19 show example charts generated by the display processor 56.

The chart shown in each figure is in polar coordinates, with a circumferential direction in the coordinate system corresponding to the incident direction θ of the radiation and the radial direction in the coordinate system corresponding to the energy (energy interval) of the radiation.

As shown in FIG. 17, when the incident direction and the energy interval are determined for the incident radiation as a result of the above-described process, a mark M1 is displayed at a position corresponding to the determined incident direction and the determined energy interval on the polar coordinate system. In the exemplified case, the incident direction is 90 degrees and the energy interval is 600 keV-800 keV. In addition, in the present embodiment, a size of the mark M1 corresponds to a magnitude of the dosage in the energy interval in which the mark M1 exists. In other words, the mark M1 is represented with a larger diameter when the dosage is higher and with a smaller diameter when the dosage is lower. Therefore, there is an advantage that the incident direction, energy interval, and dosage information of the incident radiation can be intuitively recognized by looking at the chart shown in FIG. 17.

In the above-described example, the magnitude of the dosage is represented with the magnitude of the diameter of the mark M1. Alternatively, for example, the magnitude of the dosage may be represented by varying the form, color phase, or brightness of the mark. For example, when the magnitude of dosage and the color phase are to be correlated, it is desirable to display a color bar near the chart shown in FIG. 17.

FIG. 18 shows an example of a display when two radiations having different energies are incident from the same direction. As shown by marks M2 and M3, in this example, two radiations are incident from the direction of 120-degrees, with energies of the radiations in two energy intervals including the energy interval of 600 keV-800 keV and the energy interval of 800 keV-1000 keV. Alternatively, the interval width of the energy may be more finely set in order to improve the energy resolution on the chart.

In an example shown in FIG. 19, an example display in a case wherein two radiations having different energies are incident from different directions is shown. In this example, a mark M4 represents incidence of radiation belonging to the energy interval of 600 keV-800 keV from an incident direction of 30 degrees and a mark M5 represents incidence of radiation belonging to the energy interval of 800 keV-1000 keV from an incident direction of 90 degrees.

In the above-described embodiment, the response functions are generated using a simulation. Alternatively, it is also possible to generate the response functions by collecting experimental data. Also, although the radiation measurement apparatus in the above-described embodiment is a monitoring post, the present invention can be applied to other radiation measurement apparatuses, such as a survey meter. For example, the present invention can be applied to a survey meter which detects β radiation. In the above-described embodiment, the radiation detecting section comprises three scintillator blocks, but, alternatively, the radiation detecting section may comprise four or more scintillator blocks. When two scintillator blocks are provided, that is, when two scintillator blocks having a semicircle shape seen from the top are installed in the detector, while it is possible to differentiate incident directions in two ranges of 0 degree-180 degrees and 180 degrees-360 degrees, the specific coming direction cannot be identified as in the above-described embodiment. Therefore, it is desirable to place three or more scintillator blocks. In the above-described embodiment, five energy intervals are set, but alternatively, it is also possible to set six of more energy intervals or four or less energy intervals. However, because it becomes difficult to precisely determine the matching relationship when the number of energy intervals is small, it is generally desirable to set, for example, four or more energy intervals.

The data processor shown in FIG. 1 may be formed using a microprocessor or the like. Alternatively, it is also possible to realize the data processor as functions of software operating on a CPU. In this case, the MCA 46, 48, and 50 and subsequent structures may be replaced with a computer.

The invention claimed is:

1. A radiation measurement apparatus comprising:
a detecting section which comprises a plurality of detectors provided to have directivity characteristics that differ from each other, and which detects radiation with the detectors;
a calculating section which calculates, based on a plurality of detection data obtained by the plurality of detectors and for each energy interval among a plurality of energy intervals, actual ratio information representing mutual ratios for a plurality of individual counts corresponding to the plurality of detectors;
a generating section which generates, for each energy interval, a response function which provides theoretical ratio information which changes according to an incident direction; and
a comparing section which compares a plurality of actual ratio information corresponding to the plurality of energy intervals with a plurality of response functions corresponding to the plurality of energy intervals, and identifies, when a matching relationship is determined between particular actual ratio information and particular theoretical ratio information, at least one of an incident direction and an energy interval for radiation detected by the detecting section based on the matching relationship.

2. The radiation measurement apparatus according to claim 1, wherein
the comparing section identifies both of the incident direction and the energy interval for the radiation detected by the detecting section.

3. The radiation measurement apparatus according to claim 1, wherein
the actual ratio information for each energy interval includes a plurality of actual count ratios determined by normalizing the plurality of individual counts with a sum of the individual counts, and
the theoretical ratio information according to the incident direction includes a plurality of theoretical count ratios to be compared with the plurality of actual count ratios.

4. The radiation measurement apparatus according to claim 3, wherein
the calculating section comprises:

a spectrum creating section which creates a plurality of spectra corresponding to the plurality of detectors based on the plurality of detection data;

a first calculating section which sets a plurality of energy intervals for the plurality of spectra and determines, for each energy interval, a plurality of individual counts corresponding to the plurality of detectors; and a second calculating section which determines, for each energy interval, the plurality of actual count ratios by dividing the plurality of individual counts by a total count which is a sum of the individual counts.

5. The radiation measurement apparatus according to claim 1, wherein the response function for each energy interval generated by the generating section is formed as an equation or a table which provides theoretical ratio information for each incident direction.

6. The radiation measurement apparatus according to claim 5, wherein the response function for each energy interval is generated in advance as a result of execution of a simulation in which radiation having a predetermined energy is virtually irradiated from each direction using a virtual model for the detecting section.

7. The radiation measurement apparatus according to claim 1, wherein the plurality of detectors comprise n scintillator blocks (where $n \geq 3$) placed around a center axis in the detecting section.

8. The radiation measurement apparatus according to claim 2, wherein when radiation from a plurality of sources having energies that differ from each other are incident on the detecting section, the comparing section determines a plurality of matching relationships corresponding to the plurality of radiations, and an incident direction and an energy interval are identified for each determined matching relationship.

9. The radiation measurement apparatus according to claim 2, further comprising:

a creating section which creates a chart by mapping a mark on a predetermined coordinate system based on the incident direction and the energy interval identified by the comparing section, and a displaying section which displays the chart.

10. The radiation measurement apparatus according to claim 9, wherein a circumferential direction in the predetermined coordinate system represents the incident direction and a radial direction in the predetermined coordinate system represents the energy interval.

11. The radiation measurement apparatus according to claim 9, wherein the creating section changes a display form of the mark according to dosage information.

12. The radiation measurement apparatus according to claim 11, wherein the dosage information represents a dosage calculated for an energy interval identified by the comparing section.

13. The radiation measurement apparatus according to claim 11, wherein the change of the display form of the mark includes at least one of a size change, a shape change, a color phase change, and a brightness change.

14. A data processing method in a radiation measurement apparatus which comprises a detecting section having n detectors (where $n \geq 3$) provided to have horizontal directivity characteristics that differ from each other, the method comprising the steps of:

calculating, based on n detection data obtained using the n detectors and for each energy interval among m energy intervals (where $m \geq 2$), actual ratio information representing mutual ratios for n individual counts corresponding to the n detectors;

generating, for each energy interval, a response function which provides theoretical ratio information which changes according to an incident direction; and comparing m actual ratio information corresponding to the m energy intervals with m response functions corresponding to the m energy intervals, and identifying, when a matching relationship is determined between particular actual ratio information and particular theoretical ratio information, an incident direction and an energy interval for radiation detected by the detecting section based on the matching relationship.

15. The data processing method according to claim 14, further comprising the step of:

creating a chart by mapping a mark representing the identified incident direction and the identified energy interval on a polar coordinate system in which the incident direction is correlated to a circumferential direction and the energy interval is correlated to a radial direction.

* * * * *

UNITED STATES PATENT AND TRADEMARK OFFICE
CERTIFICATE OF CORRECTION

PATENT NO. : 7,734,447 B2 Page 1 of 1
APPLICATION NO. : 11/917459
DATED : June 8, 2010
INVENTOR(S) : Yoshiyuki Shirakawa et al.

It is certified that error appears in the above-identified patent and that said Letters Patent is hereby corrected as shown below:

Title Page, In Item (73);
Change
(73) Assignees: National Institute of Radiological Science, Chiba (JP); Aloka Co., Ltd., Tokyo (JP)

To be

(73) Assignees: National Institute of Radiological Sciences, Chiba (JP); Aloka Co., Ltd., Tokyo (JP)

Signed and Sealed this

Fourteenth Day of September, 2010

David J. Kappos
*Director of the United States Patent and Trademark Office*